Patented Apr. 16, 1946

2,398,670

UNITED STATES PATENT OFFICE 2,398,670

MODIFIED ROSIN ESTER-DRYING OIL VARNISH BASES AND PROCESS OF MAKING SAME

John B. Rust, West Orange, N. J., assignor to Montclair Research Corporation, a corporation of New Jersey No Drawing. Application May 12, 1944,
Serial No. 535,391

12 Claims. (Cl. 260—23)

The present invention relates to drying oil compositions suitable as bases for varnishes.

In my copending applications Serial Nos. 531,117, filed April 14, 1944, and 534,531, filed May 6, 1944, I have described and claimed resinous reaction products obtained by heating a rosin ester with an unsaturated alcohol ester of a polycarboxylic acid. Such resins are obtained by heating said reactants at between 200° and 300° C. until the resinous reaction product has a suitably high softening point. Unsaturated alcohols for use in the reaction are allyl alcohol, methallyl alcohol, crotyl alcohol, propargyl alcohol and the like, these alcohols being esterified with a polycarboxylic acid such as phthalic, succinic, oxalic, maleic, fumaric, citraconic, itaconic, malonic, adipic, sebacic, etc. The rosin esters are particularly polyhydric alcohol esters, the polyhydric alcohols being glycerol, glycols, polyglycols, pentaerythritol, dipentaerythritol, mannitol, trihydroxymethylaminomethane and the like. A diallyl ester may be reacted with a rosin ester made from equivalent amounts of rosin and polyhydric alcohol or a monoallyl ester may be reacted with a rosin ester made from rosin and an excess of polyhydric alcohol, substantially neutral resinous reaction products being obtained in both cases. The present application is a continuation in part based upon the two above named applications and relates to the modification of such resinous products by reaction thereof with drying oils to form drying oil-modified resins and varnish bases.

It is an object of this invention to provide resin-drying oil varnishes in which the said resins accelerate the bodying of the drying oil.

It is an object of this invention to provide resin-drying oil varnishes in which the said resins are heat advancing.

It is an object of this invention to provide resin-drying oil varnishes in which the drying oil is of the soft type such as refined linseed oil, bodied linseed oil, conjugated linseed oil, soya bean oil, conjugated soya bean oil, dehydrated castor oil, perilla oil, sunflower-seed oil, fish oils, and the like, as well as when the oil is of the hard drying type such as tung and oiticica oils.

It is an object of this invention to provide resin-drying oil varnishes which possess excellent hardness irrespective of the hardness of the resin.

Still further objects and advantages of the present invention will become apparent from the detailed description set forth below, it being understood that the more detailed description is given by way of illustration and explanation only, and not by way of limitation, since various changes therein may be made by those skilled in the art without departing from the scope and spirit of the invention.

Linseed oil in which the double bonds have been partially conjugated to produce a faster drying oil, such as that known to the trade as Conjulin, when heated slowly to 270°–275° C., gelled after 20 minutes at this temperature. When 1 part of glyceryl abietate and 2 parts of Conjulin were heated at 275°–310° C. for 40 minutes, a soft varnish base was obtained which could be pulled into a string approximately 12–16 inches in length, thus showing that the unmodified rosin ester retards rather than accelerates the gelation of the so-called soft drying oil. When 1 part of a glyceryl abietate resin modified with diallyl maleate and 2 parts of Conjulin were heated to 275° C. in 35 minutes a viscous, stringy varnish base was obtained which was on the point of gelation. While the resins are quite soluble when properly dispersed and dissolved in the drying oil, the oil-resin base will not cut back readily in mineral spirits unless it is properly formulated.

I have found that in the process of the present invention, rosin esters modified with unsaturated alcohol polycarboxylic acid esters wherein the unsaturated alcohol ester is less than 25% of the rosin ester, are soluble in drying oils and may be cooked with the oil in the usual manner. However, in the cases where 25% or more (and up to about 3 parts of unsaturated alcohol ester to 1 part of rosin ester) of modifying unsaturated alcohol-polycarboxylic ester is used or where the modified rosin esters are heat-convertible, then the resin may first be heated with a small amount of oil followed by further amounts until the desired oil length is secured. Alternatively, the modified resin may be heated with somewhat less than the desired quantity of drying oil to a relatively high temperature and then cut back with the remaining oil in order to check the cooking. Any of such variations may be used to secure the varnishes of the present invention which exhibit superior properties of drying speed, hardness, gloss, water and alkali resistance and pale color.

The varnishes of this invention are prepared by heating the resin with from ½ to an equal weight of a drying oil (for example, 10% to 50% of the total oil required to make the varnish) at temperatures ranging from 260° C.–300° C. in order to secure complete solubility or dispersion of the resin in the oil. The remainder of the oil may then be added and heating continued at 250°–275° C. until the composition has the requisite viscosity characteristics of a varnish base. Thinners such as mineral spirits are added at approximately 200° C. Driers are then added to give clear, light-colored varnishes which possess a suitable viscosity. Such varnishes dry to hard, colorless films in 3–10 hours, depending upon the formulation. These varnishes possess, uniquely, a high Sward "rocker" hardness and may be so tested after 12–15 hours, whereas varnishes prepared from drying oils and ester gum are slower drying and show a pronounced stickiness when tested before drying for 24 hours with the Sward "rocker."

These varnishes possess a good resistance to water and, in general, are unaffected after 36 to 96 hours immersion. In alkali solutions, softening and darkening occur after 15 to 30 minutes.

The color, resistance to darkening, hardness, generally high viscosity of these varnish formulations make them desirable for a wide range of commercial uses.

The following examples are given to illustrate the process and products of the present invention and are not to be considered as limiting. All proportions are given by weight.

*Example 1.*—20 parts of a resin (acid No. 9.4 and softening point 118° C.) obtained by heating 100 parts of rosin glyceride with 25 parts of diallyl maleate for 8 hours between 200° and 260° C., and 10 parts of Conjulin (a commercial linseed oil as explained above) were heated together to 265° C. in 22 minutes, there being obtained a clear, hard resin bead. 30 parts of Conjulin were added and heating continued slowly to 250° C. to give a rubbery base which could be pulled into a 24 inch string when hot, but appeared as a sticky gel when cold. The base was thinned with 60 parts of mineral spirits to which 0.5% lead and 0.05% cobalt (as naphthenates) were added. The resulting varnish was clear and light-colored. It dried hard in 8½ hours and after 48 hours the dried film showed a Sward hardness of 39.

*Example 2.*—20 parts of a heat-convertible resin (acid No. 8.5, softening point 104° C.), capable of forming an oil-insoluble gel when heated alone and which was obtained by heating 70 parts of rosin glyceride and 30 parts of diallyl maleate at between 200° and 260° C. for 8 hours, and 10 parts of Conjulin were heated slowly to 255° C. in 40 minutes to give a hard, tough oil-modified resin. 30 parts of Conjulin were added and heating continued to 240°–245° C. for an additional 20 minutes. The varnish base was stringy when hot, but hard and gel-like when cold. The varnish base was thinned with 60 parts of mineral spirits containing 0.5% lead and 0.05% cobalt (as naphthenates). The resulting varnish was clear and light-colored. The varnish dried to a hard film in 9 hours and after 48 hours possessed a Sward hardness of 35.

*Example 3.*—A resin (acid No. 16.1 and softening point 118° C.) was prepared by heating pentaerythritol tetra-abietate (100 parts) with diallyl fumarate (25 parts) at between 200° and 250° C. for 7 hours. 20 parts of this resin and 10 parts of alkali refined linseed oil were heated slowly to 260° C., a gel-like oil-modified resin being obtained. 30 parts of raw China-wood oil were added and heating continued to 250° C. over a period of ½ hour. An extremely light-colored varnish base was obtained. This was thinned with 60 parts of mineral spirits containing 0.5% lead and 0.05% cobalt (as naphthenates). The resulting varnish was clear and light-colored. The varnish dried to a hard film in 7 hours and possessed a Sward hardness of 47 after 48 hours.

*Example 4.*—A resin was prepared by heating 711.6 parts of WW rosin and 95.15 parts of glycerol together at 234° C.–255° C. for 2 hours. 613.8 parts of this glyceryl diabietate and 128.7 parts of monoallyl maleate were heated together slowly to 200° C. in 1 hour. Heating was then continued at 200°–250° C. for 4 hours. A light-colored resin was obtained which possessed an acid number of 37 and a softening point of 115° C.

20 parts of the above resin and 10 parts of raw tung oil were heated to 270° C. over a period of 30 minutes. 30 parts of raw tung oil were added and heating continued at 250° C. for about 15 minutes. A tough varnish base was obtained. This was thinned with 60 parts of mineral spirits to which 0.5% lead and 0.05% cobalt (as naphthenates) were added. A light-colored, clear varnish base was obtained which dried to a hard film in 3½ hours, and after 48 hours possessed a Sward hardness of 49.

*Example 5.*—A resin was prepared by heating 187.6 parts of ester gum, 9.2 parts of glycerol, and 51 parts of monomethallyl maleate together for 1 hour at 200° C., then at 200°–250° C. until a light-colored, hard, tough resin was secured. This resin possessed a softening point of 103° C. and an acid number of 27.2.

20 parts of the above resin and 10 parts of dehydrated castor oil were heated slowly to 280° C. over a period of 35 minutes to secure a clear, hard bead. 30 parts of dehydrated castor oil were added and heating continued at 270°–275° C. for 10 minutes to secure a well bodied varnish base. The varnish base was thinned with 60 parts of mineral spirits to which was added 0.5% lead and 0.05% cobalt (as naphthenates). The resulting varnish was clear and light-colored. It dried to a hard film in 9 hours and after 48 hours possessed a Sward hardness of 31.

*Example 6.*—A varnish was prepared from alkali-refined linseed oil bodied to a viscosity equivalent to Z on the Gardner scale and an interreaction product of glyceryl abietate and diallyl maleate. The resin was prepared by heating 225 parts of glyceryl abietate and 75 parts of diallyl maleate together in a suitable reactor equipped with a thermometer, agitator, and air condenser at 200°–240° C. for 8 hours. A light-colored resin possessing a softening point of 115° C. was obtained. 30 parts of the above resin and 15 parts of alkali-refined linseed oil were heated to 300° C. in 30 minutes. 15 parts of alkali-refined linseed oil were added and heating continued at 270° C. for 10 minutes. 30 parts of alkali-refined linseed oil were added and heating continued at 250°–260° C. for 50 minutes. The resulting varnish base could be pulled into a string 15–18 inches in length. The varnish base was thinned with 90 parts of mineral spirits to which 0.5% lead and 0.05% cobalt (as naphthenates) was added. The resulting varnish was clear and light-colored. It dried to a hard film in 8½ hours and possessed a Sward hardness of 33.

*Example 7.*—A varnish was prepared from Conjulin and the interreaction product of tris-hydroxymethylaminomethane triabietate and monoallyl maleate. The resin was prepared as follows: 270 parts of WW rosin and 36.3 parts of trihydroxymethylaminomethane were heated together at 200° C.–250° C. for 2 hours. 181.2 parts of the above rosin ester and 29.25 parts of monoallyl maleate were heated together at 200°–250° C. for 1½ hours. A hard, brittle, light-colored resin was obtained which possessed an acid number of 18.5 and a softening point of 128° C.

20 parts of the above resin and 10 parts of Conjulin were heated to 270° C. in 30 minutes. 10 parts of Conjulin were added and heating continued at 250°–265° C. for 30 minutes. 20 parts of Conjulin were then added and the temperature held at 230°–240° C. for 35 minutes. The resulting varnish base could be pulled into a string 18 to 24 inches in length. It was thinned with 60 parts of mineral spirits to which was added 0.5% lead and 0.05% cobalt (as naphthenates). A light-colored, clear varnish was obtained. This varnish dried to a hard film in 8 hours and after 48 hours a film of the varnish possessed a Sward hardness of 41.

*Example 8.*—A resin was prepared by heating 150 parts of ester gum and 50 parts of diallyl phthalate at from 200° C. to 300° C. over a period of 7 hours. The light-colored resin possessed an acid number of 29.3 and a softening point of 114° C.

30 parts of the above resin and 15 parts of Conjulin were slowly heated to 275° C., a clear, hard bead being obtained. 15 parts of Conjulin were added and heating was continued to 275° C. 30 parts of Conjulin were then added and heating continued at 260° C. for 20 minutes to give a clear varnish base which could be drawn into a string 18 to 24 inches in length. The varnish base was thinned with 90 parts of mineral spirits to which was added 0.5% lead and 0.05% cobalt (as naphthenates). The resulting varnish was clear and light-colored. It dried to a hard film in 10 hours and after 48 hours possessed a Sward hardness of 27.

*Example 9.*—A resin was prepared by heating 105 parts of pentaerythrityl abietate and 45 parts of diallyl phthalate at 200° C.–280° C. over a period of 7 hours. An extremely light-colored resin was obtained which possessed a softening point of 108° C. and an acid number of 21.3.

20 parts of this resin and 10 parts of alkali-refined linseed oil were heated together at 260°–270° C. for 15 minutes. 30 parts of Conjulin were added and heating continued slowly to 270° C. over a period of 35 minutes. The resulting varnish base was thinned with 60 parts of mineral spirits to which was added 0.5% lead and 0.05% cobalt (as naphthenates). The resulting varnish was clear and light-colored. The varnish dried to a hard film in 12 hours and after 48 hours the varnish possessed a Sward hardness of 15.

I claim:

1. The process of making a varnish base which comprises heating, at between 260° C. and 300° C., a hereinafter defined soluble resinous reaction product, with from ½ to an equal weight of a drying oil until dispersion of the resin in the oil occurs, and thereafter adding a further quantity of a drying oil, the total amount of drying oil being sufficient to form a varnish base of predetermined oil-length, and heating at between 250° C. and 275° C. until the composition is homogeneous and capable of being thinned to form a varnish; the resinous reaction product being one obtained by heating at between 200° C. and 300° C. a rosin ester of a polyhydric alcohol and a dicarboxylic acid ester of an unsaturated monohydric alcohol of from 3 to 4 carbons, the dicarboxylic acid-unsaturated alcohol ester being from 25% of the resin ester up to 3 parts thereof to 1 part of the rosin ester.

2. The process of making a varnish base which comprises heating, at between 260° C. and 300° C., a hereinafter defined soluble resinous reaction product, with from ½ to an equal weight of a drying oil until dispersion of the resin in the oil occurs, and thereafter adding a further quantity of a drying oil, the total amount of drying oil being sufficient to form a varnish base of predetermined oil-length, and heating at between 250° C. and 275° C. until the composition is homogeneous and capable of being thinned to form a varnish; the resinous reaction product being one obtained by heating at between 200° C. and 300° C. a rosin ester of a polyhydric alcohol and a dicarboxylic acid ester of an allyl alcohol, the dicarboxylic acid allyl ester being from 25% of the rosin ester up to 3 parts thereof to 1 part of the rosin ester.

3. The process of making a varnish base which comprises heating, at between 260° C. and 300° C., a hereinafter defined soluble resinous reaction product, with from ½ to an equal weight of a drying oil until dispersion of the resin in the oil occurs, and thereafter adding a further quantity of a drying oil, the total amount of drying oil being sufficient to form a varnish base of predetermined oil-length, and heating at between 250° C. and 275° C. until the composition is homogeneous and capable of being thinned to form a varnish; the resinous reaction product being one obtained by heating at between 200° C. and 300° C. a rosin-glycerol ester and a diallyl ester of a dicarboxylic acid, the diallyl dicarboxylic acid ester being from 25% of the rosin ester up to 3 parts thereof to 1 part of the rosin ester.

4. The process of claim 1 in which the drying oil is a linseed oil.

5. The process of making a varnish base which comprises heating, at between 260° C. and 300° C., a hereinafter defined soluble resinous reaction product, with from ½ to an equal weight of a linseed oil until dispersion of the resin in the oil occurs, and thereafter adding a further quantity of linseed oil, the total amount of oil being sufficient to form a varnish base of predetermined oil-length, and heating at between 250° C. and 275° C. until the composition is homogeneous and capable of being thinned to form a varnish; the resinous reaction product being one obtained by heating at between 200° C. and 300° C. a rosin-glycerol ester and diallyl maleate, the diallyl maleate being from 25% of the rosin ester up to 3 parts thereof to 1 part of the rosin ester.

6. The process of making a varnish base which comprises heating, at between 260° C. and 300° C., a hereinafter defined soluble resinous reaction product, with from ½ to an equal weight of a linseed oil until dispersion of the resin in the oil occurs, and thereafter adding a further quantity of linseed oil, the total amount of oil being sufficient to form a varnish base of predetermined oil-length, and heating at between 250° C. and 275° C. until the composition is homogeneous and capable of being thinned to form a varnish; the resinous reaction product being one obtained by heating at between 200° C. and 300° C. a rosin-glycerol ester and diallyl phthalate, the diallyl phthalate being from 25% of the rosin ester up to 3 parts thereof to 1 part of the rosin ester.

7. A varnish base made according to the process of claim 1.

8. A varnish base made according to the process of claim 2.

9. A varnish base made according to the process of claim 3.

10. A varnish base made according to the process of claim 5.

11. A varnish base made according to the process of claim 6.

12. A varnish consisting of the varnish base made according to claim 1, dissolved in a varnish thinner and containing driers.

JOHN B. RUST.